(12) United States Patent
Raybern

(10) Patent No.: US 12,534,208 B2
(45) Date of Patent: Jan. 27, 2026

(54) SWIVEL INDICATING MECHANISM FOR AIRCRAFT SEAT

(71) Applicant: Textron Innovations Inc., Providence, RI (US)

(72) Inventor: Blake David Raybern, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 197 days.

(21) Appl. No.: 18/364,363

(22) Filed: Aug. 2, 2023

(65) Prior Publication Data

US 2025/0042553 A1    Feb. 6, 2025

(51) Int. Cl.
*B60N 2/14* (2006.01)
*B64D 11/06* (2006.01)

(52) U.S. Cl.
CPC .............. *B64D 11/064* (2014.12); *B60N 2/14* (2013.01)

(58) Field of Classification Search
CPC ......... B64D 11/064; A47C 3/18; A47C 3/185; B60N 2/14
See application file for complete search history.

(56) References Cited

U.S. PATENT DOCUMENTS

| | | | | |
|---|---|---|---|---|
| 2,437,199 A * | 3/1948 | Kirk | .................... | B64D 11/06 248/599 |
| 2,939,511 A * | 6/1960 | Gilson | .................... | A47C 3/18 248/372.1 |
| 3,622,202 A * | 11/1971 | Brown | ................ | B60N 2/0887 297/344.22 |
| 4,729,601 A * | 3/1988 | Walle | .................... | B64D 11/06 297/344.1 |
| 10,722,033 B1 * | 7/2020 | Chen | ........................ | A47C 3/18 |
| 10,925,401 B1 * | 2/2021 | Kassner | ................ | A47C 9/022 |
| 12,004,650 B2 * | 6/2024 | Brooks | .................... | A47C 1/11 |
| 2004/0195886 A1 * | 10/2004 | Beatty | .................... | B60N 2/938 297/344.21 |
| 2010/0102611 A1 * | 4/2010 | Bunea | .................... | B60N 2/146 297/344.22 |
| 2013/0161990 A1 * | 6/2013 | Oleson | .................. | B60N 2/146 297/344.21 |
| 2015/0296987 A1 * | 10/2015 | Hondros | ................ | A47D 1/002 297/344.21 |
| 2025/0033776 A1 * | 1/2025 | Bell | .................. | B64D 11/0643 |

FOREIGN PATENT DOCUMENTS

| | | | | |
|---|---|---|---|---|
| DE | 3014367 A1 * | 4/1980 | | |
| DE | 202021100919 U1 * | 5/2021 | ............... | A47C 3/18 |
| DE | 102023000224 A1 * | 7/2024 | | |
| EP | 4079636 A1 * | 10/2022 | ......... | B60N 2/02253 |
| KR | 200171559 Y1 * | 3/2000 | ............... | A47C 3/18 |
| KR | 100893633 B1 * | 4/2009 | | |
| KR | 20200078967 A * | 7/2020 | ............. | A47D 1/004 |

* cited by examiner

Primary Examiner — Timothy J Brindley
(74) Attorney, Agent, or Firm — Slater Matsil, LLP

(57) ABSTRACT

An aircraft seat includes a base frame; a seat frame rotatably connected to a top side of the base frame, wherein the seat frame is configured to rotate about a vertical axis; a slot plate connected to the top side of the base frame, wherein the slot plate has a slot in a top surface of the slot plate; and a pin mount connected to a bottom side of the seat frame, wherein the pin mount has a pin that protrudes downward, wherein the pin is configured to protrude into the slot when the seat frame is rotated into a first orientation relative to the base frame.

20 Claims, 13 Drawing Sheets

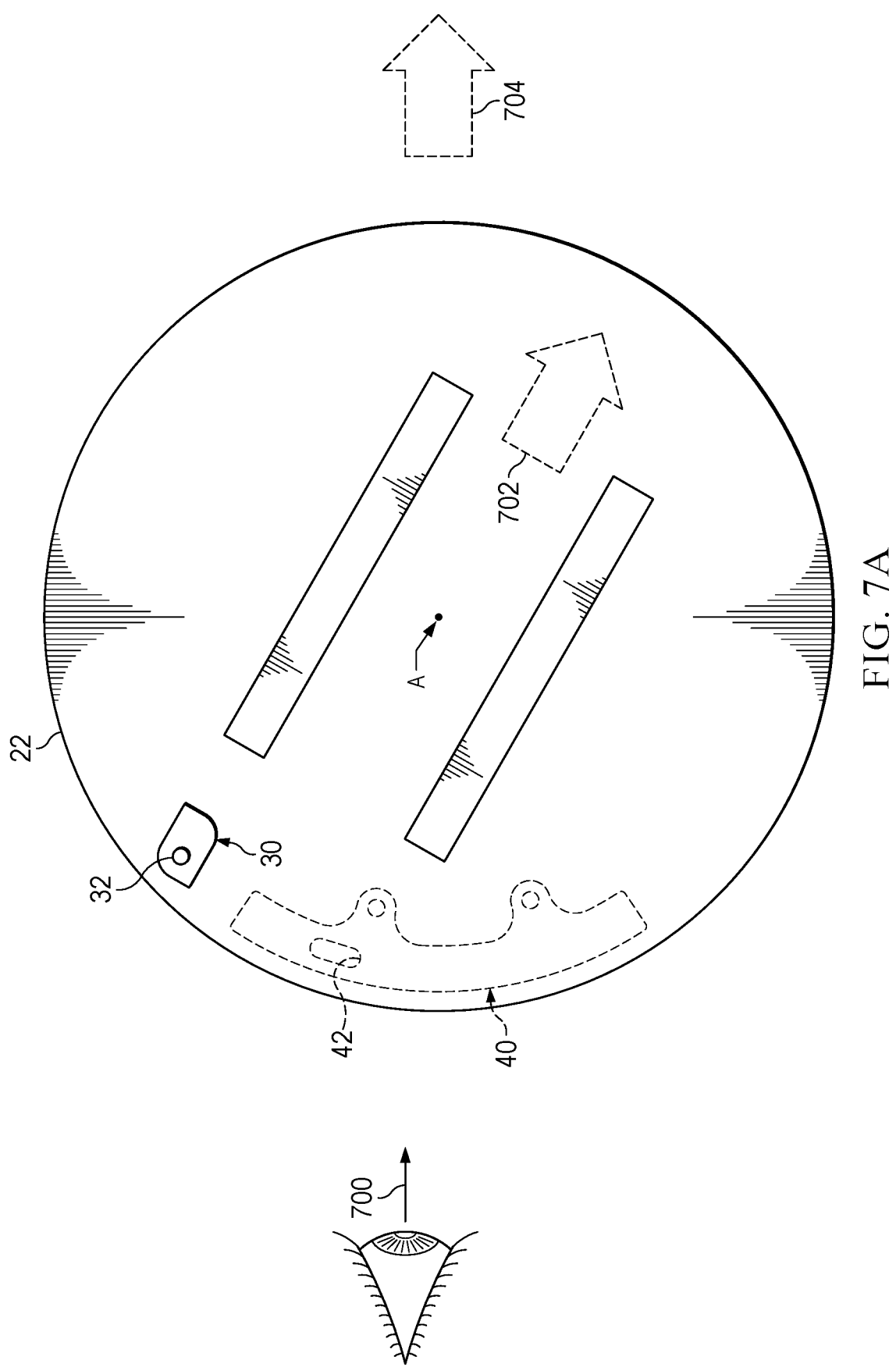

SWIVEL INDICATING MECHANISM FOR AIRCRAFT SEAT

TECHNICAL FIELD

The present invention relates generally to a system and method for an aircraft seat, and, in particular embodiments, to a system and method for indicating a swivel angle of the aircraft seat.

BACKGROUND

Some aircraft have passenger seats that can swivel (e.g. rotate) in order to allow the passenger to face various directions. In some cases, these seats may be swiveled to a particular orientation during taxi, takeoff, and/or landing (e.g., "TTOL") operations of the aircraft.

SUMMARY

In accordance with some embodiments, an aircraft seat includes a base frame; a seat frame rotatably connected to a top side of the base frame, wherein the seat frame is configured to rotate about a vertical axis; a slot plate connected to the top side of the base frame, wherein the slot plate has a slot in a top surface of the slot plate; and a pin mount connected to a bottom side of the seat frame, wherein the pin mount has a pin that protrudes downward, wherein the pin is configured to protrude into the slot when the seat frame is rotated into a first orientation relative to the base frame. In an embodiment, the pin mount further includes a spring attached to the pin, wherein the spring exerts a downward force on the pin. In an embodiment, the pin mount further includes a set screw attached to the pin. In an embodiment, the first orientation is a Taxi, Takeoff, and Landing (TTOL) orientation. In an embodiment, the slot plate comprises an arc-shaped plate. In an embodiment, the ends of the slot plate are ramps. In an embodiment, the pin is a first distance from the vertical axis and the slot is the first distance from the vertical axis. In an embodiment, a bottom end of the pin has a first radius and wherein a curved surface of the slot has a second radius that is greater than the first radius.

In accordance with some embodiments, an aircraft seat includes a base plate; a swivel plate configured to rotate relative to the base plate; and a swivel indicating system, including: a pin mount attached to the base plate; a pin held by the pin mount; a spring held by the pin mount, wherein the spring is configured to exert a downward force on the pin; and a slot plate attached to the base plate, wherein the slot plate includes a slot, wherein the pin is free of the slot plate when the swivel plate has been rotated to a first angle, wherein the pin physically contacts an interior surface of the slot when the swivel plate has been rotated to a second angle. In an embodiment, the pin extends through a hole in the base plate. In an embodiment, the pin physically contacts the interior surface of the slot when the swivel plate has been rotated to a third angle that is within ±5.2 degrees of the second angle. In an embodiment, the bottom end of the pin when the swivel plate has been rotated to the first angle is lower than the bottom end of the pin when the swivel plate has been rotated to the second angle. In an embodiment, a width of the slot is greater than a width of the pin. In an embodiment, sidewalls of the slot are ramps. In an embodiment, a depth of the slot from a top surface of the slot plate is between 0.5 mm and 2 mm.

In accordance with some embodiments, a method includes rotating a seat frame of an aircraft seat to a first angle relative to a base frame of the aircraft seat, wherein a pin connected to the seat frame is free of a slot plate connected to the base frame when the seat frame is at the first angle; rotating the seat frame to a second angle relative to the base frame, wherein the pin physically contacts a first top surface region of the slot plate when the seat frame is at the second angle, wherein the first top surface region is adjacent a slot in the slot plate; and rotating the seat frame to a third angle relative to the base frame, wherein the pin physically contacts a second top surface region of the slot plate when the seat frame is at the third angle, wherein the second top surface region is within the slot. In an embodiment, the third angle corresponds to a Taxi, Takeoff, and Landing (TTOL) orientation. In an embodiment, the method includes locking the seat frame when the seat frame is at the third angle. In an embodiment, rotating the seat frame from the second angle to the third angle generates a haptic indication in the seat frame. In an embodiment, the second top surface region is lower than the first top surface region.

BRIEF DESCRIPTION OF THE DRAWINGS

For a more complete understanding of the present invention, and the advantages thereof, reference is now made to the following descriptions taken in conjunction with the accompanying drawings, in which:

FIGS. 7A, 7B, 8A, 8B, 9A, 9B, 10A, and 10B illustrate various views of intermediate steps in an example operation of a swivel indicating system, in accordance with some embodiments.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
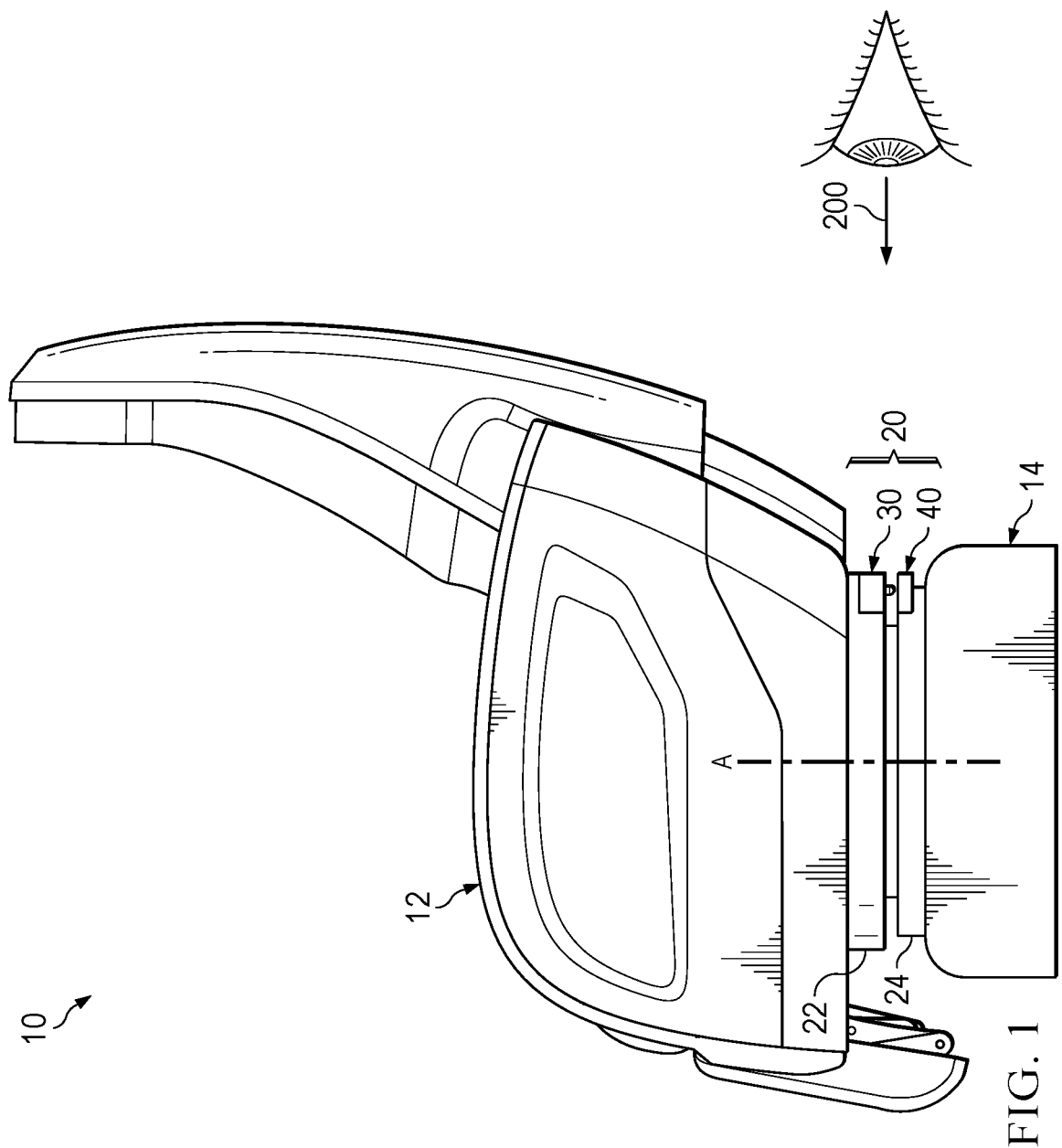
FIG. 1 illustrates an aircraft seat with a swivel indicating system, according to some embodiment.

FIG. 1 shows an aircraft seat 10 with swivel indicating system 20, in accordance with some embodiments. The seat 10 comprises a seat frame 12, a swivel plate 22 attached to a bottom side of the seat frame 12, a base frame 14, and a base plate 24 attached to a top side of the base frame 14, in accordance with some embodiments. The swivel indicating system 20 comprises a pin mount 30 attached to the swivel plate 22 and a slot plate 40 attached to the base plate 24, in some embodiments. The swivel plate 22 is rotatably connected to the base plate 24 such that the swivel plate 22 may swivel (e.g., rotate or pivot) relative to the base plate 24 about an axis A. In this manner, the collective orientation of the seat frame 12, the swivel plate 22, and the pin mount 30 is configured to swivel relative to the collective orientation of the base frame 14, the base plate 24, and the slot plate 40. The base frame 14 is connected to the surrounding aircraft (not shown), and thus a passenger may swivel the seat frame 12 to face various directions relative to the orientation of the aircraft. The seat frame 12 may be swiveled a full 360° or a smaller angular range, depending on the configuration or design of the seat 10.

In some cases, the seat frame 12 may be swiveled to a particular orientation (within a small angular range) during aircraft operations such as taxi, takeoff, and/or landing (e.g., "TTOL"). The swivel indicating system 20, described in greater detail below, provides a physical sensation (e.g. haptic feedback) to a passenger that indicates when the seat frame 12 has been swiveled into a particular orientation (e.g., for TTOL or the like). For example, FIG. 1 shows the seat frame 12 positioned in a TTOL orientation, in accordance with some embodiments. In some cases, the seat 10 comprises a locking mechanism (not pictured) that prevents rotation of the swivel plate 22 when activated. In some cases, the swivel plate 22 must be swiveled to a particular orientation (e.g., the TTOL orientation) for the locking mechanism to be activated.

Figure 2:
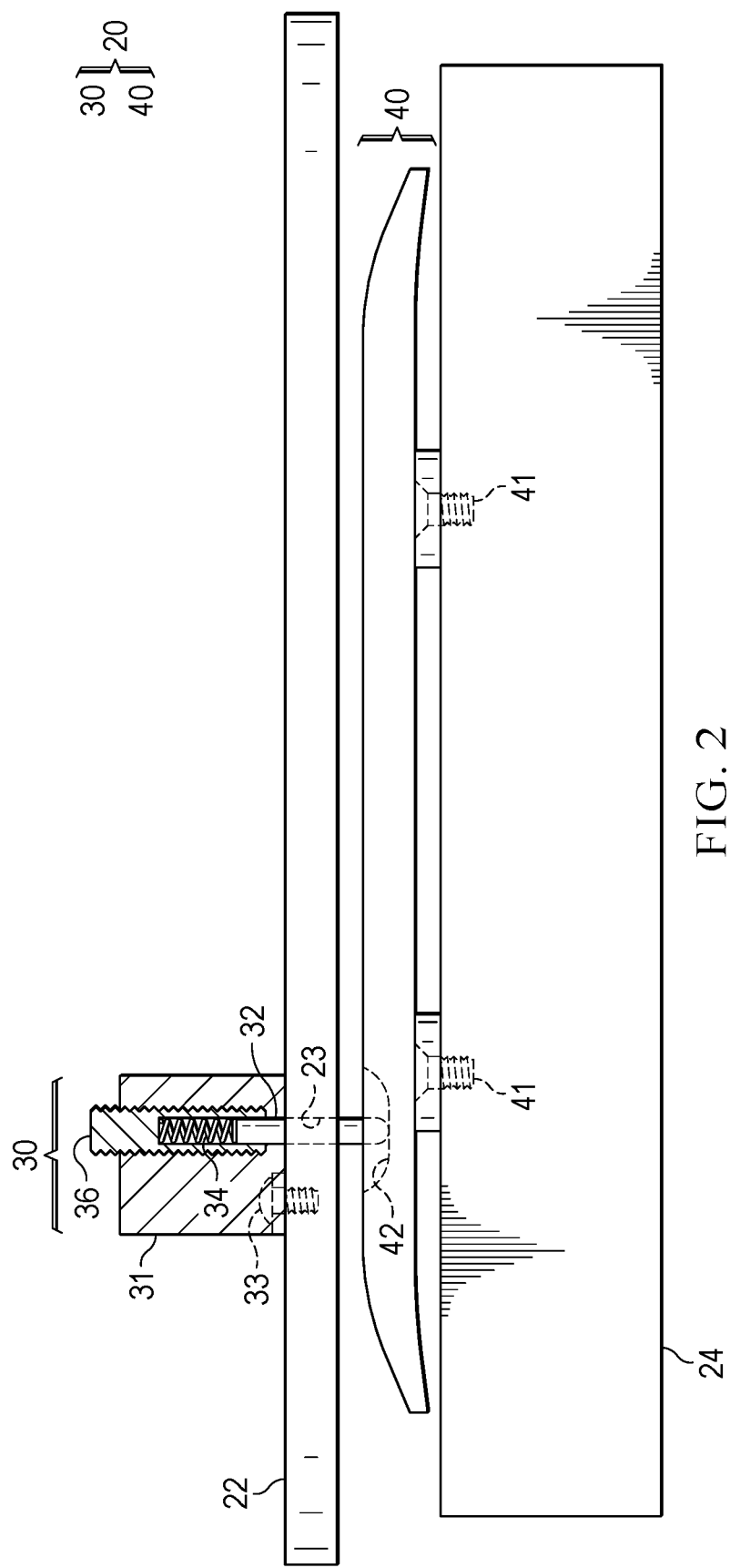
FIG. 2 illustrates the swivel indicating system of an aircraft seat, according to some embodiment.

FIG. 2 illustrates a swivel indicating system 20 of a seat 10, in accordance with some embodiments. FIG. 2 shows a view towards the rear side of the seat 10, similar to the view direction 200 indicated in FIG. 1. In other embodiments, the swivel indicating system 20 may be located at other places within the seat 10 (e.g., near the front side, near the left side, near the right side, etc.). FIG. 2 illustrates a swivel plate 22, a pin mount 30, a base plate 24, and a slot plate 40, in accordance with some embodiments. Some other features of the seat 10 are omitted from FIG. 2 for clarity. FIG. 2 is intended as an explanatory or representative illustration, and accordingly the various features shown in FIG. 2 may have other dimensions, relative sizes, shapes, arrangements, or configurations, and all such variations are considered within the scope of the present disclosure.

The pin mount 30 is fixedly connected to a top side of the swivel plate 22 by one or more fasteners 33, in accordance with some embodiments. The fasteners 33 may comprise screws, nuts, bolts, washers, the like, or other suitable fasteners. In other embodiments, the pin mount 30 is formed as part of the swivel plate 22. In some embodiments, the pin mount 30 comprises a mount body 31 that holds or secures a pin 32. The pin 32 protrudes from a bottom side of the mount body 31. As shown in FIG. 2, the pin 32 may extend through a through-hole 23 in the swivel plate 22 and protrude from a bottom side of the swivel plate 22. In some embodiments, the pin 32 is mechanically or physically coupled to a spring 34 (e.g., a coil spring or the like) or other extending mechanism that imparts a downward force on the pin 32. The pin 32 may be configured to impinge on a top surface of the slot plate 40 when positioned over the slot plate 40, described in greater detail below. The spring 34 may impart a downward force to maintain contact between the pin 32 and a top surface of the slot plate 40 as the pin 32 swivels over the top surface of the slot plate 40. In some embodiments, the pin 32 and/or the spring 34 is mechanically or physically coupled to a set screw 36 that is threaded into the mount body 31. The set screw 36 may be adjusted, for example, to control the vertical position of the pin 32 and/or the force imparted by the spring 34. In some embodiments, the spring 34 and/or portions of the pin 32 are contained within the set screw 36. The mount body 31 and/or the pin 32 may be formed of steel or another suitable material.

Figure 3:
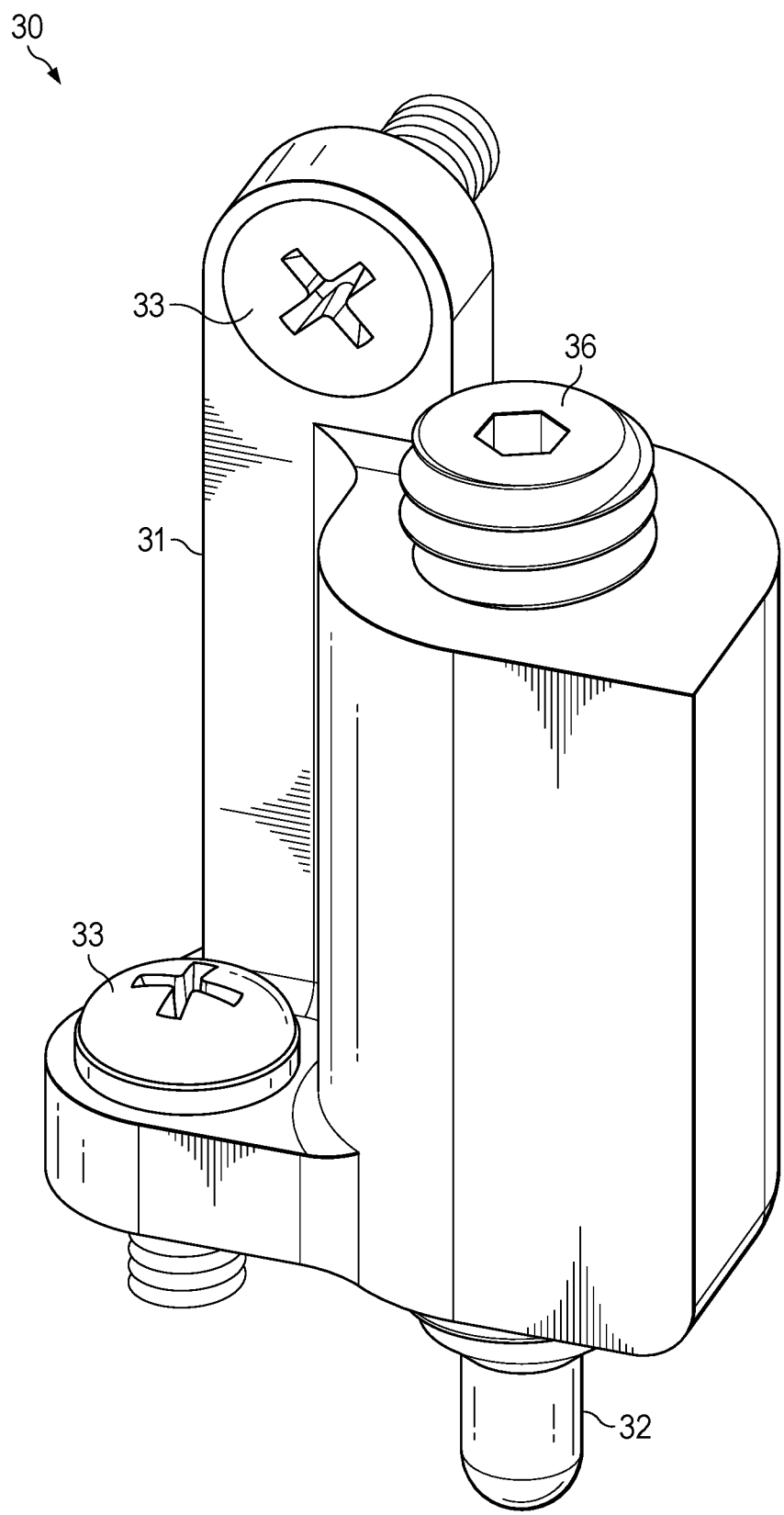
FIG. 3 illustrates a three-dimensional view of a pin mount, in accordance with some embodiments.

FIG. 3 shows a three-dimensional view of a pin mount 30, in accordance with some embodiments. The pin mount 30 shown in FIG. 3 comprises two fasteners 33 (e.g., screws) that respectively connect the pin mount 30 to a swivel plate 22 at a top surface (e.g., a lateral surface) of the swivel plate 22 and at a sidewall surface (e.g. at a vertical surface) of the swivel plate 22. The pin mount 30 shown in FIG. 3 is a representative example, and other pin mounts are possible.

Returning to FIG. 2, the slot plate 40 is fixedly connected to a top side of the base plate 24, in accordance with some embodiments. The slot plate 40 includes a slot 42 in a top side of the slot plate 40. The slot 42 may be a slot, recess, depression, groove, trench, or the like formed in a top surface of the slot plate 40, for example. The slot plate 40 may be connected to the base plate 24 by one or more fasteners 41, which may comprise screws, nuts, bolts, washers, or the like and which may extend through openings or through holes (e.g., through-holes 41' in FIGS. 4A-4B) in the slot plate 40 in some embodiments. In other embodiments, the slot plate 40 is formed as part of the base plate 24. The slot plate 40 may be formed of steel or another suitable material. In other embodiments, a seat 10 may comprise more than one slot plate 40, and a slot plate 40 may comprise more than one slot 42.

Figure 4A:
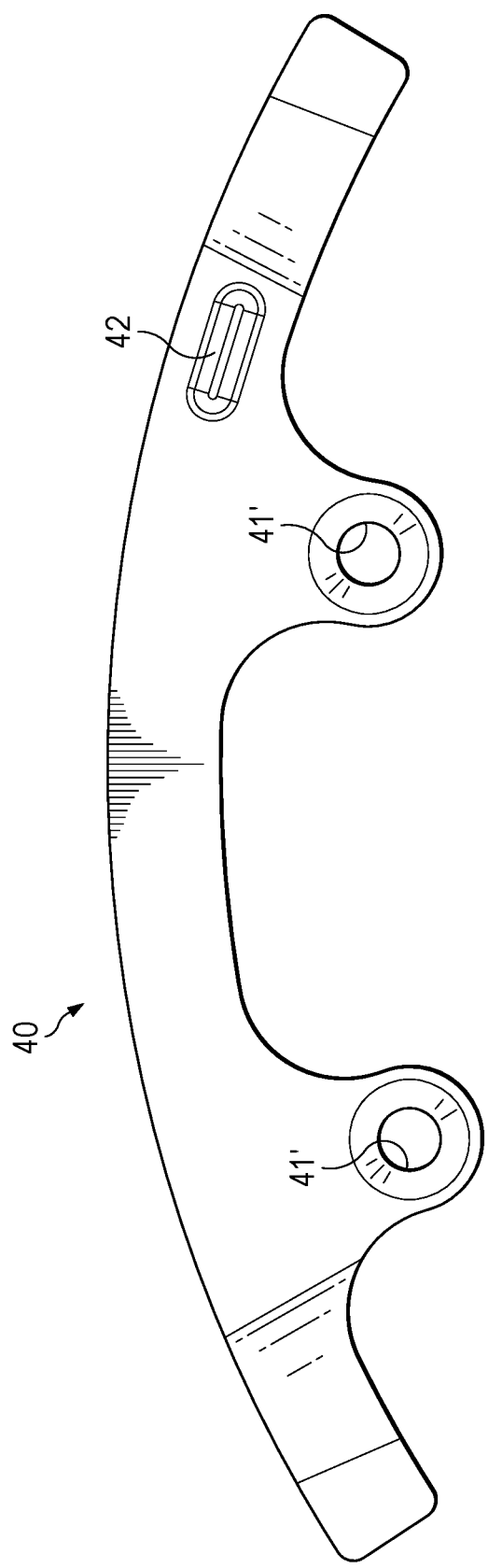
FIGS. 4A and 4B illustrate a plan view and a three-dimensional view of a slot plate, in accordance with some embodiments.
Figure 4B:
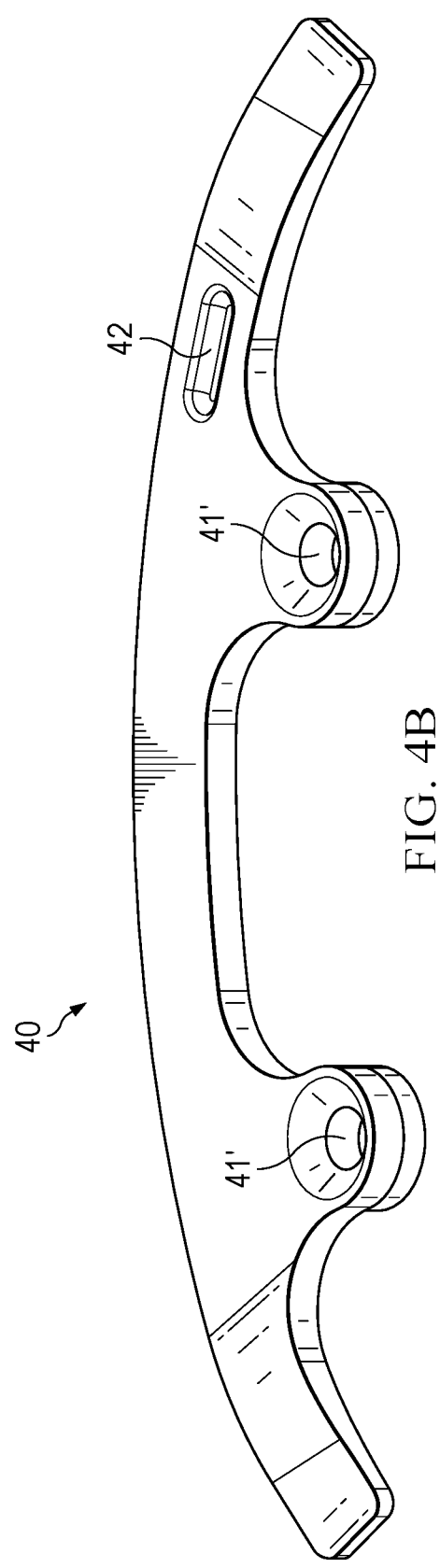

FIG. 4A illustrates a plan view of a slot plate 40 and a FIG. 4B illustrates a three-dimensional view of a slot plate 40, in accordance with some embodiments. The slot plate 40 shown in FIGS. 4A-4B are representative examples, and other slot plates are possible. The slot plate 40 shown in FIGS. 4A-4B comprises through-holes 41' that allow fasteners to connect the slot plate 40 to a base plate, and other arrangements or configurations of through-holes 41' are possible. As shown in FIGS. 4A-4B, in some embodiments, the slot plate 40 is curved or arc-shaped a plan view, though other shapes are possible. For example, in some embodiments, the slot plate 40 is shaped approximately like an arc of a circle centered on the axis A. In such embodiments, the slot plate 40 may be approximately shaped like a circular arc subtending an angle that is between about 60° and about 70°, though other angles are possible. The slot plate 40 may be positioned and shaped such that the pin 32 is swept along the length of the slot plate 40 as the swivel plate 22 is rotated. For example, the slot plate 40 and the pin 32 may both comprise approximately the same radius from the axis A. In particular, the slot 42 may be located on the swivel plate 22 such that the pin 32 extends into the slot 42 (see FIG. 2) when the swivel plate 22 has been swiveled into a specific orientation, such as a TTOL orientation. In some embodiments, the ends of the slot plate 40 may be angled downward to form "ramps" that engage with the pin 32 as the pin 32 is moved over the ends the slot plate 40. In some embodiments, the thickness of the ends of the slot plate 40 may taper or decrease, as shown in FIGS. 2 and 4B. In some embodiments, the width of the ends of the slot plate 40 may taper or decrease.

Figure 5:
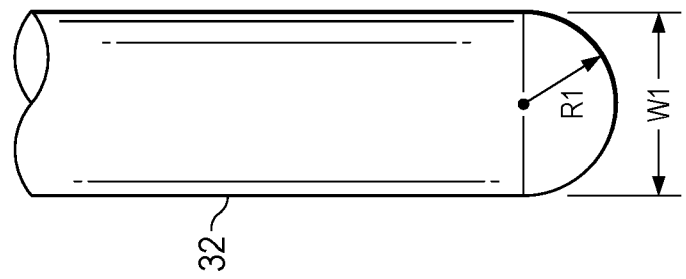
FIG. 5 illustrates a portion of a pin, in accordance with some embodiments.

FIG. 5 illustrates a magnified view of a portion of a pin, in accordance with some embodiments. The pin 32 shown in FIG. 5 comprises an approximately cylindrical shaft having a width W1 (e.g. a diameter) that is in the range of about 2 mm to about 4 mm, though other widths are possible. In other embodiments, the shaft of the pin 32 may be a shape other than cylindrical, may be tapered, may have multiple widths, or may comprise other suitable variations. FIG. 5 shows a bottom region of a pin 32 having a rounded end (or "head"), though in other embodiments the end of the pin 32 may have a different shape, such as flat, rectangular, angled, tapered, conical, spherical, circular, elliptical, ellipsoidal, cylindrical, or any other suitable variation. In some embodiments, the spherical end of the pin 32 may have a radius R1 that is in the range of about 1 mm to about 2 mm, which may correspond to about half of the width W1 in some cases. Other radii are possible.

Figure 6A:
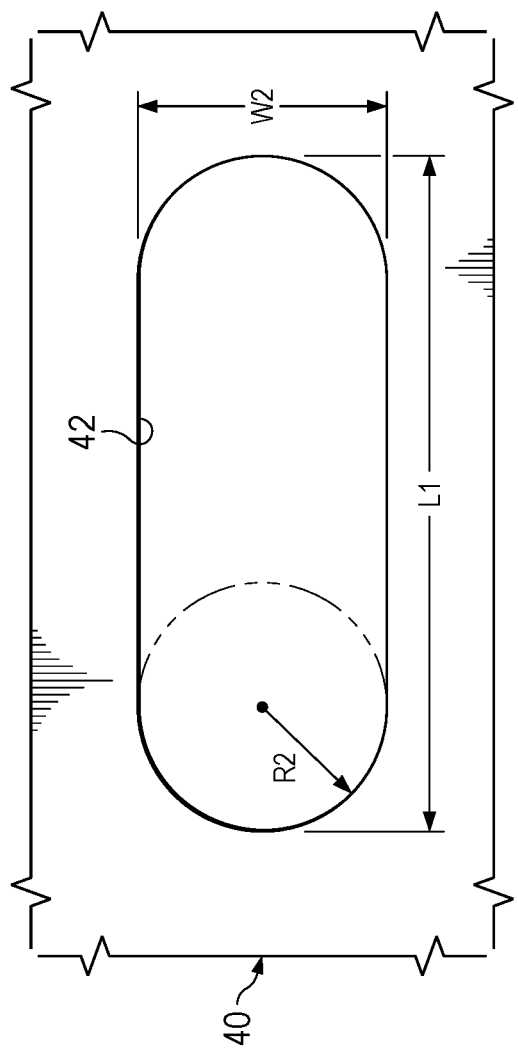
FIGS. 6A and 6B illustrate a plan view and a cross-sectional view of a slot, in accordance with some embodiments.
Figure 6B:
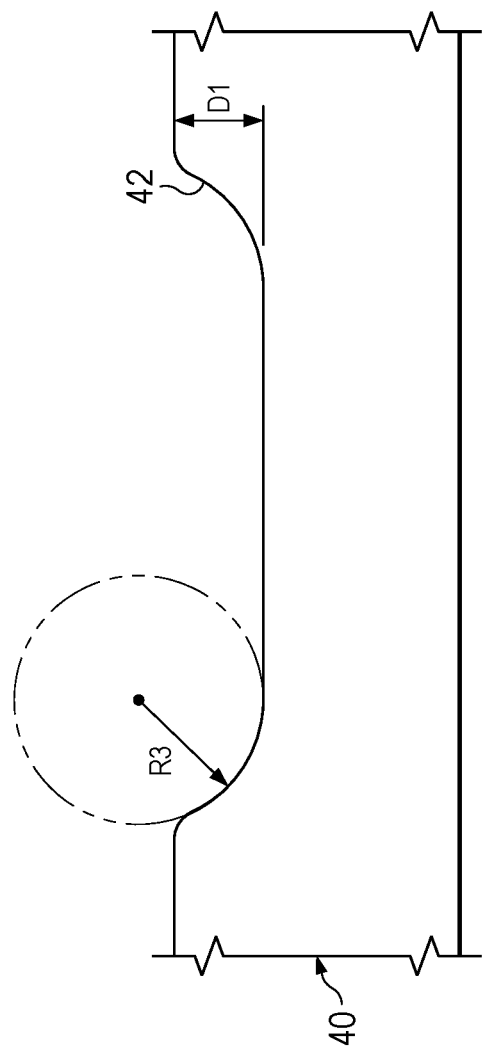

FIGS. 6A-6B illustrate magnified views of a portion of a slot plate 40 with a slot 42, in accordance with some embodiments. FIG. 6A is a plan view and FIG. 6B is a cross-sectional view. The slot 42 shown in FIG. 6A is, for example, a depression in a top surface of the slot plate 40 that has a "stadium" shape in a plan view. In other embodiments, the slot 42 may have another shape, such as an oval, an ellipse, a rectangle, an arc, or another suitable shape. In some embodiments, the slot 42 has a width W2 in the range of about 3 mm to about 5 mm, though other widths are possible. In some embodiments, the width of the slot 42 may change along the length of the slot 42. For example, a width (e.g., W2) of the slot 42 may be larger or smaller near the middle of the slot 42 than near the ends of the slot 42. Other variations of widths are possible. In some embodiments, the slot 42 has a length Li in the range of about 9 mm to about 11 mm, though other lengths are possible. In some embodiments, the slot 42 subtends an angle that is within ±5.2° from the axis A.

As shown in FIG. 6B, the slot 42 may comprise a flat bottom surface that is a depth D1 from a top surface of the slot plate 40 that is in the range of about 0.5 mm to about 2 mm. Other depths are possible. In other embodiments, a bottom surface of the slot 42 may be convex, concave, irregular, curved, textured, or have another suitable variation. In some embodiments, the sidewalls (e.g., ends or edges) of the slot 42 may have a profile that is curved or S-shaped (e.g., sigmoidal) as shown in FIG. 6B. In other embodiments, the sidewalls may be angled, circular, elliptical, rounded, or have another suitable profile.

In some embodiments, the ends and/or edges of a slot 42 may be shaped to reduce lateral forces on a pin 32 as the pin 32 enters or exits the slot 42. For example, the ends of a slot 42 may have a radius of curvature greater than a radius of a pin 32. With reference to FIG. 6A, the ends of the slot 42 may have a radius of curvature R2 that is greater than the radius R1 of the pin 32. Similarly, the ends of the slot 42 shown in FIG. 6B may have a radius of curvature R3 that is greater than the radius R1 of the pin 32. In some cases, the smallest radius of curvature of a slot 42 end, either in plan view or cross-section, may be greater than the radius R1 of the pin 32. In some embodiments, the depth D1 of the slot 42 is less than the radius R1 of the pin 32. By forming the slot 42 to be shallower than the radius R1 of the pin 32, the pin 32 can pass across both ends of the slot 42 in either direction without the shape of the slot 42 preventing motion of the pin 32. The various shapes and radii shown in FIGS. 5, 6A, and 6B are examples, and other suitable variations are possible.

FIGS. 7A through 10B illustrate various views of intermediate steps in an example operation of a swivel indicating system 20, in accordance with some embodiments. FIGS. 7A, 8A, 9A, and 10A illustrate plan views of a seat 10 as its swivel plate 22 is swiveled into a TTOL orientation. FIGS. 7B, 8B, 9B, and 10B illustrate respective views corresponding to FIGS. 7A, 8A, 9A, and 10A along the view direction 700 indicated in FIG. 7A. The views of FIGS. 7B, 8B, 9B, and 10B may be similar to the view shown in FIG. 2, in some cases. In FIGS. 7A, 8A, 9A, and 10A, the arrow 702 represents the orientation of the swivel plate 22, and the arrow 704 represents the direction of the designated TTOL orientation for the seat 10. For example, in some cases, the TTOL direction 704 may correspond to a "forward" direction. In other cases, the arrow 704 may represent an orientation or direction other than the TTOL direction 704. FIGS. 7A-10B show the swivel plate 22 being rotated in a counter-clockwise direction, but in other cases the swivel plate 22 may be rotated in a clockwise direction. Some features of the seat 10 are omitted from FIGS. 7A-10B for clarity. FIGS. 7A-10B are intended as an explanatory or representative illustrations, and accordingly the various features shown may have other dimensions, relative sizes, shapes, arrangements, or configurations, and all such variations are considered within the scope of the present disclosure.

Figure 7B:
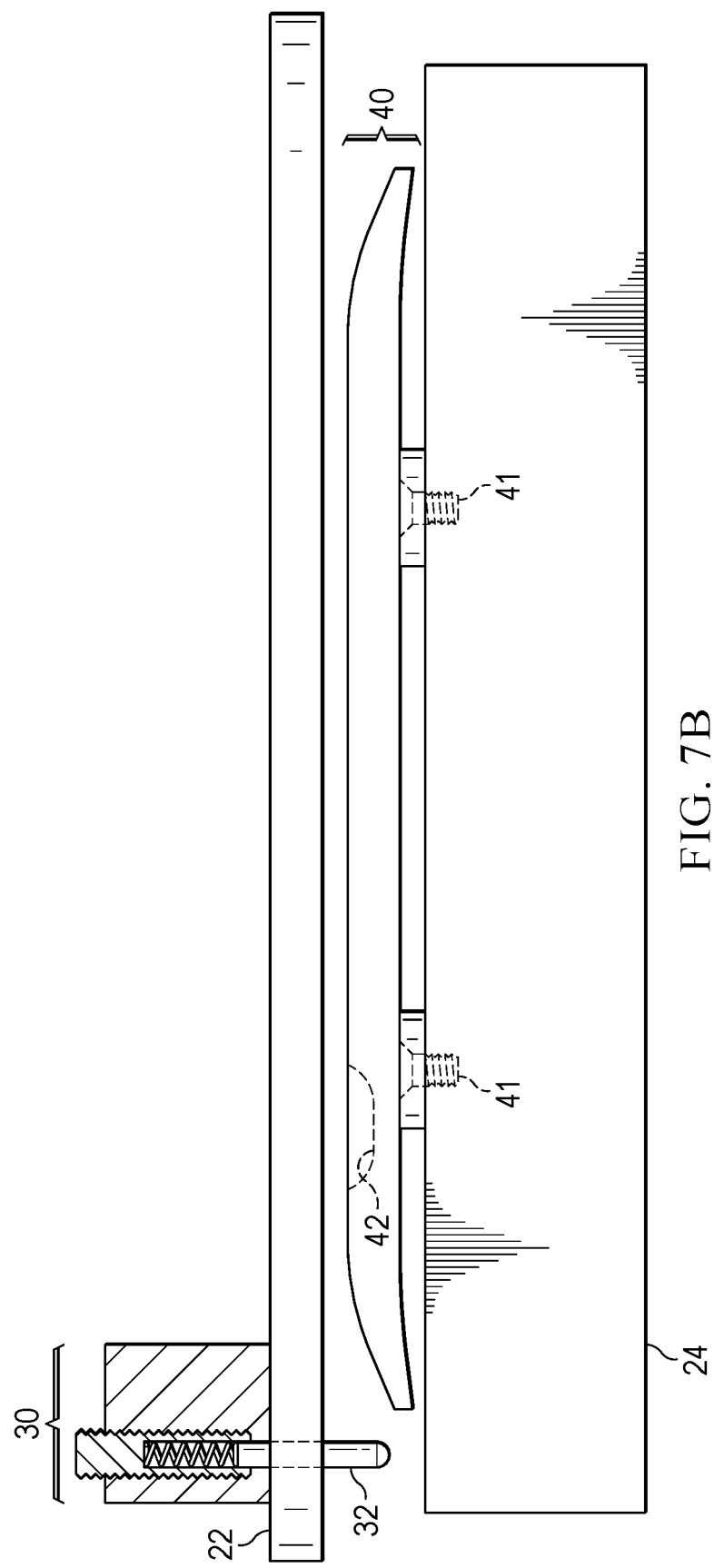

In FIGS. 7A-7B, the swivel plate 22 has an orientation 702 that is rotated away from the TTOL direction 704. As shown in FIGS. 7A-7B, the swivel plate 22 has been rotated such that the pin 32 is not over the slot plate 40. The orientation of the swivel plate 22 shown in FIGS. 7A-7B is an example, and other orientations are possible. When the swivel plate 22 is swiveled such that the pin 32 is not over the slot plate 40, the end of the pin 32 may be free of physical contact with other features and may be lower than at least a portion of the top surface of the slot plate 40. The spring 34 may impart a downward force that extends the pin 32 fully downward, in some embodiments.

Figure 8A:
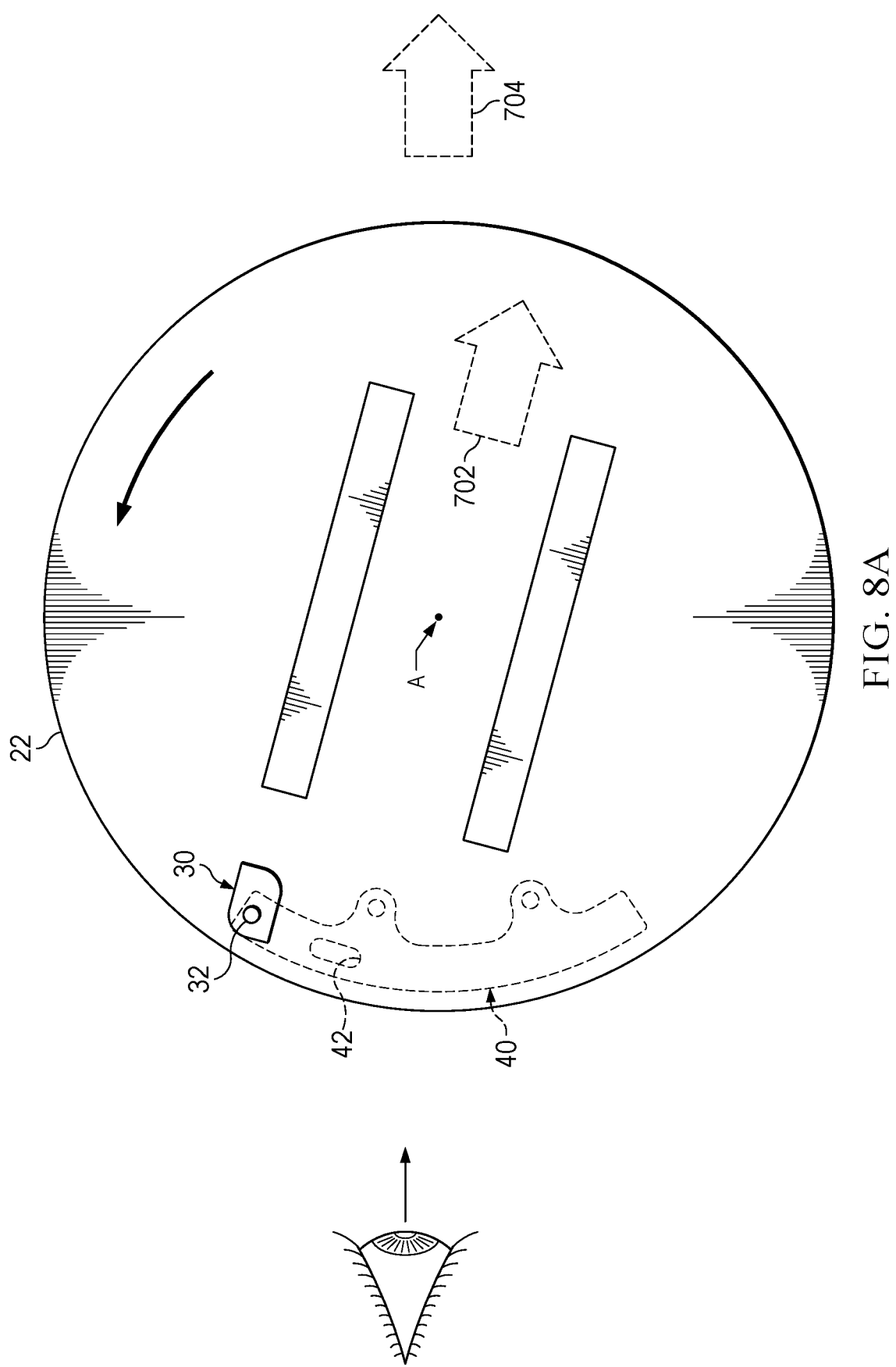
Figure 8B:
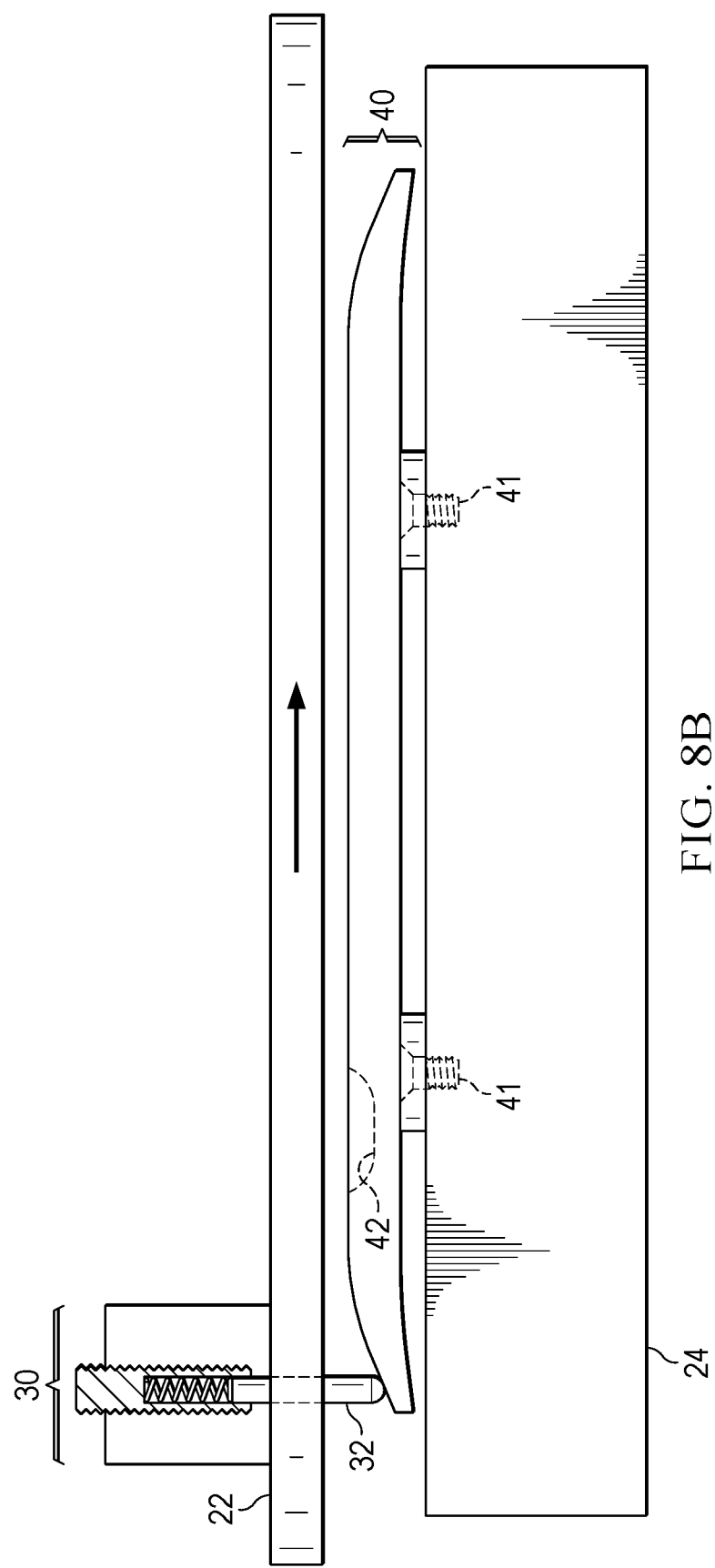

In FIGS. 8A-8B, the swivel plate 22 has been rotated counter-clockwise such that the end of the pin 32 physically contacts the slot plate 40, in accordance with some embodiments. In some embodiments, the ends of the slot plate 40 may be ramped, angled, or tapered such that, as the swivel plate 22 is rotated, the end of the pin 32 initially sweeps over a portion of the slot plate 40 before physically contacting it. In this manner, as the swivel plate 22 rotates the pin 32 over an end surface of the slot plate 40, the pin 32 may be pushed upwards into the pin mount 30, while the spring 34 imparts a downward force that helps maintains physical contact between the pin 32 and the slot plate 40. Having ends of the slot plate 40 shaped like ramps can allow the pin 32 to transition from fully extended to contacting the surface of the slot plate 40 without being obstructed. In some cases, the passenger occupying the seat 10 may be able to feel a mechanical resistance as the pin 32 contacts the slot plate 40 due to friction between the pin 32 and the top surface of the slot plate 40. In some cases, the qualities of the friction or resistance felt by a passenger may be determined or controlled based on the properties (e.g., stiffness, tension, length, position, etc.) of the spring 34 and/or the set screw 36, or based on the properties (e.g., material, texture, etc.) of the top surface of the slot plate 40.

Figure 9A:
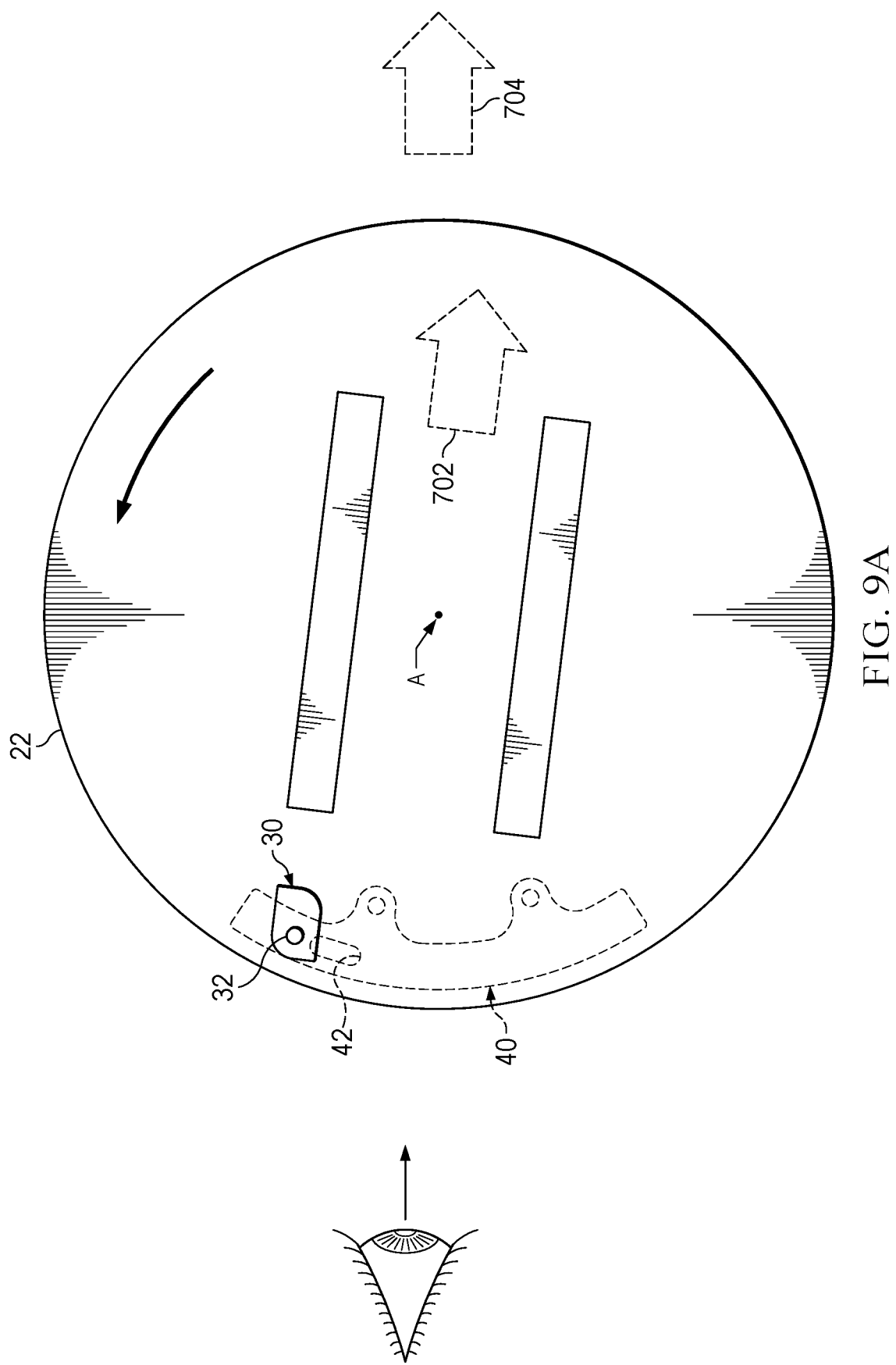
Figure 9B:
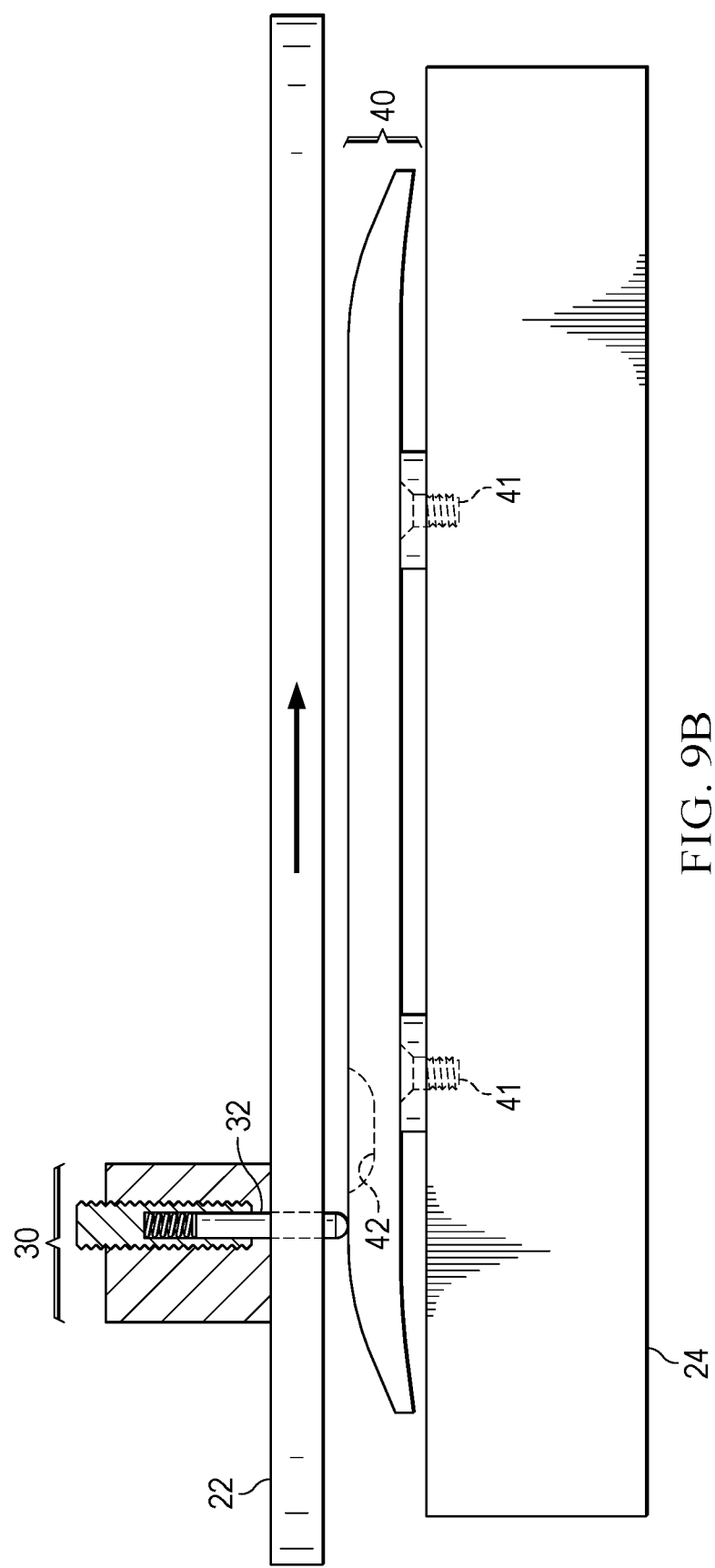

In FIGS. 9A-9B, the swivel plate 22 has been further rotated counter-clockwise such that the orientation 702 of the swivel plate 22 is closer to the TTOL direction 704, which translates the pin 32 closer to the slot 42, in accordance with some embodiments. In some embodiments, the passenger may feel a mechanical resistance as the swivel plate 22 is rotated and the pin 32 is dragged along the top surface of the slot plate 40.

Figure 10A:
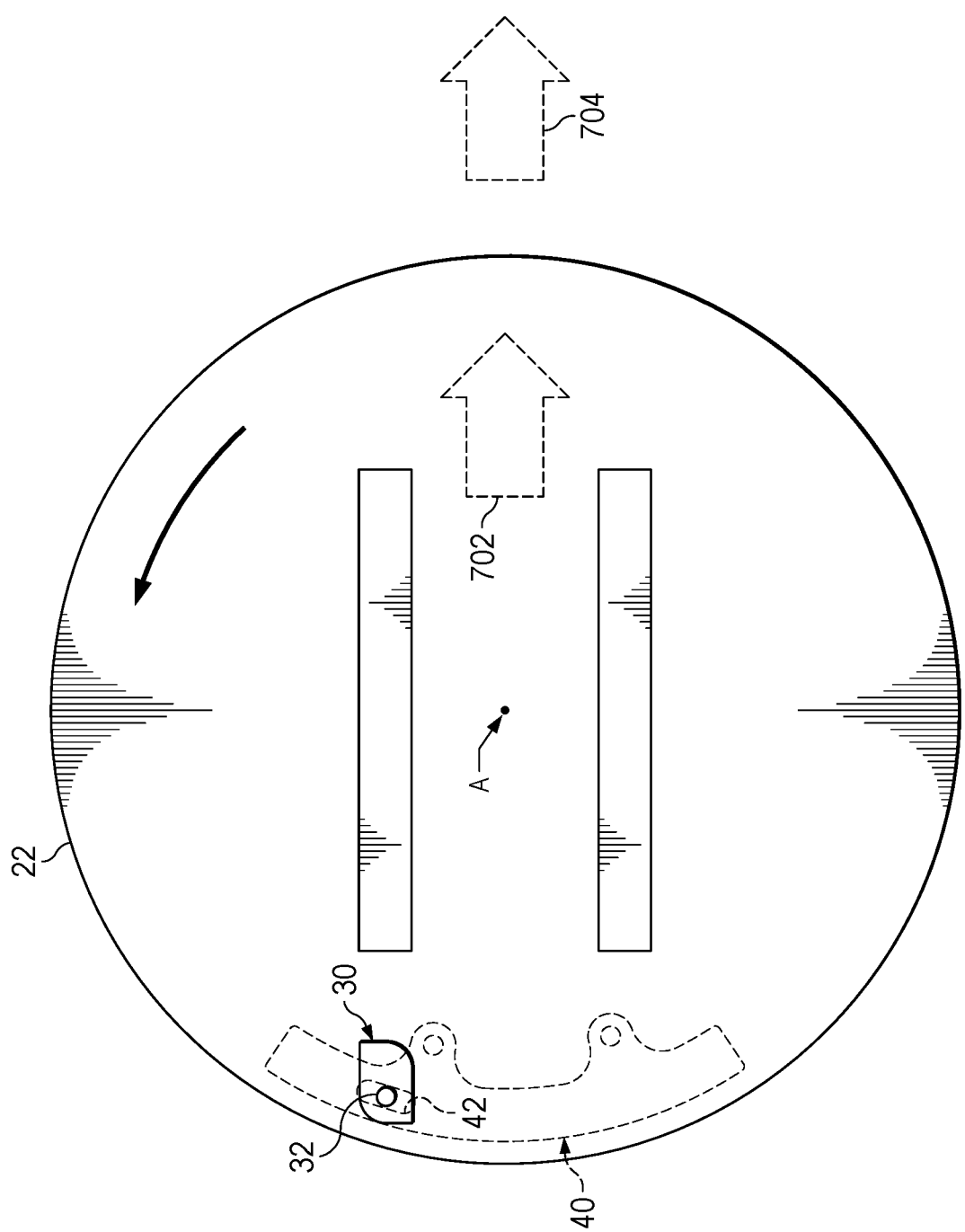
Figure 10B:
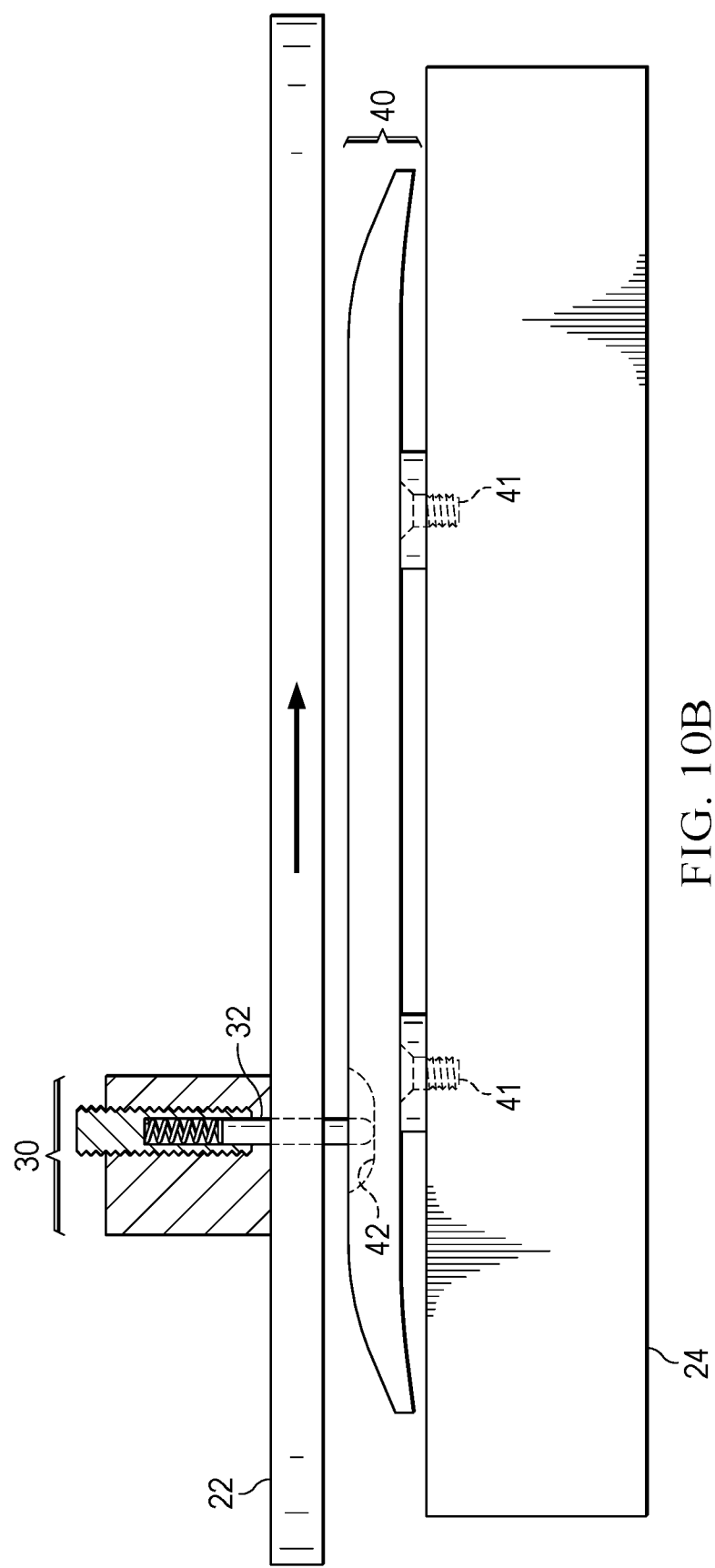

In FIGS. 10A-10B, the swivel plate 22 has been further rotated counter-clockwise such that the orientation 702 of the swivel plate 22 is approximately aligned with the TTOL direction 704, in accordance with some embodiments. Further, the pin 32 has entered into the slot 42 of the slot plate 40. The pin 32 being in the slot 42 corresponds to the swivel plate 22 being in the TTOL direction 704, and as such, the swivel indicating system 20 described herein may indicate to the passenger that the seat 10 is properly oriented in the TTOL direction 704. The TTOL direction 704 may correspond to an angular range about the "true" TTOL direction 704, such as an angular range of about ±0.5° or smaller. Accordingly, the angular range subtended by the slot 42 may correspond to the angular range of the TTOL direction 704. As the pin 32 enters the slot 42, the force imparted by the spring 34 is translated into a lateral force of the pin 32 against the ramped sidewall of the slot 42. This lateral force directs the pin 32 into the slot 42 and may be perceptible by the passenger as an indication that the swivel plate 22 has been swiveled into the TTOL direction 704. In this manner, a combination of friction and forces imparted by the spring 34 allows the swivel indicating system 20 to inform the passenger when the seat 10 is swiveled to the TTOL direction 704. In some cases, the pin 32 entering the slot 42 may produce an audible noise (e.g., a "click" or the like), a mechanical vibration, a mechanical impulse, or the like that indicates to the passenger that the seat 10 is swiveled into the proper orientation. As described previously, the swivel indicating system 20 may be adjusted to provide a particular response to the seat 10 being swiveled into the TTOL direction 704.

Further, the lateral forces between the pin 32 and the edges of the slot 42 tend to maintain the pin 32 within the slot 42 and thus tend to maintain the seat 10 in the TTOL direction 704. These lateral forces must be overcome to swivel the pin 32 out of the slot 42. In this manner, the use of a swivel indicating system 20 as described herein can help prevent the seat 10 from swiveling out of the TTOL direction 704 unless a sufficient swiveling force is applied by the passenger. In some cases, the swivel indicating system 20 allows the passenger to identify when the seat 10 is in a proper orientation such that the rotation of the seat 10 can be locked in place by a locking mechanism (not pictured), such as prior to a TTOL operation or the like.

Embodiments herein describe a swivel indicating system that provides physical feedback for a passenger when swiveling an aircraft seat into or out of a particular orientation. For example, the swivel indicating system includes may provide feedback that indicates to the passenger when the seat is swiveled into or out of a direction for taxi, takeoff, and/or landing ("TTOL"). Each swivel indicating system comprises a pin that enters or exits a slot as the seat is swiveled into the particular orientation. The embodiments are described in the context of a swivel indicating system comprising a single pin and a single slot, but in other embodiments, multiple pins and/or multiple slots may be utilized. For example, in some other embodiments, the multiple slots may correspond to multiple swivel orientations, with physical feedback provided for each orientation. Other combinations or arrangements of pins and slots are possible. The swivel indicating system described herein is mechanical and thus some embodiments may not require a power source. In this manner, the swivel indicating system may be always active. In some embodiments, the swivel indicating system described herein provides feedback that allows the passenger to identify when the seat is in a proper orientation for the seat to be locked in place, such as during TTOL operation.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An aircraft seat comprising:
   a base frame;
   a seat frame rotatably connected to a top side of the base frame, wherein the seat frame is configured to rotate about a vertical axis;
   a slot plate connected to the top side of the base frame, wherein the slot plate comprises a slot in a top surface of the slot plate, wherein the top surface of the slot plate is shaped like an arc that subtends less than a full circle, wherein the ends of the slot plate are ramps; and
   a pin mount connected to a bottom side of the seat frame, wherein the pin mount comprises a pin that protrudes downward, wherein the pin is configured to protrude into the slot when the seat frame is rotated into a first orientation relative to the base frame.

2. The aircraft seat of claim 1, wherein the pin mount further comprises a spring attached to the pin, wherein the spring exerts a downward force on the pin.

3. The aircraft seat of claim 1, wherein the pin mount further comprises a set screw attached to the pin.

4. The aircraft seat of claim 1, wherein the first orientation is a Taxi, Takeoff, and Landing (TTOL) orientation.

5. The aircraft seat of claim 1, wherein the pin is a first distance from the vertical axis and wherein the slot is the first distance from the vertical axis.

6. The aircraft seat of claim 1, wherein a bottom end of the pin has a first radius and wherein a curved surface of the slot has a second radius that is greater than the first radius.

7. The aircraft seat of claim 1, wherein the top surface of the slot plate is shaped like an arc that subtends less than 90°.

8. The aircraft seat of claim 1, wherein a bottom surface of the slot is flat.

9. An aircraft seat comprising:
   a base plate;
   a swivel plate configured to rotate relative to the base plate; and
   a swivel indicating system, comprising:
      a pin mount attached to the base plate;
      a pin held by the pin mount;
      a spring held by the pin mount, wherein the spring is configured to exert a downward force on the pin; and
      a slot plate attached to the base plate, wherein the slot plate comprises a slot, wherein sidewalls of the slot are ramps, wherein the pin is free of the slot plate when the swivel plate has been rotated to a first angle, wherein the pin physically contacts an interior surface of the slot when the swivel plate has been rotated to a second angle.

10. The aircraft seat of claim 9, wherein the pin extends through a hole in the base plate.

11. The aircraft seat of claim 9, wherein the pin physically contacts the interior surface of the slot when the swivel plate has been rotated to a third angle that is within ±5.2 degrees of the second angle.

12. The aircraft seat of claim 9, wherein the bottom end of the pin when the swivel plate has been rotated to the first angle is lower than the bottom end of the pin when the swivel plate has been rotated to the second angle.

13. The aircraft seat of claim 9, wherein a width of the slot is greater than a width of the pin.

14. The aircraft seat of claim 9, wherein a depth of the slot from a top surface of the slot plate is between 0.5 mm and 2 mm.

15. A method comprising:
rotating a seat frame of an aircraft seat to a first angle relative to a base frame of the aircraft seat, wherein a pin connected to the seat frame is free of a slot plate connected to the base frame when the seat frame is at the first angle;
rotating the seat frame to a second angle relative to the base frame, wherein the pin physically contacts a first top surface region of the slot plate when the seat frame is at the second angle, wherein the first top surface region is adjacent a slot in the slot plate; and
rotating the seat frame to a third angle relative to the base frame, wherein the pin physically contacts a second top surface region of the slot plate when the seat frame is at the third angle, wherein the second top surface region is within the slot.

16. The method of claim 15, wherein the third angle corresponds to a Taxi, Takeoff, and Landing (TTOL) orientation.

17. The method of claim 15 further comprising locking the seat frame when the seat frame is at the third angle.

18. The method of claim 15, wherein rotating the seat frame from the second angle to the third angle generates a haptic indication in the seat frame.

19. The method of claim 15, wherein the second top surface region is lower than the first top surface region.

20. The aircraft seat of claim 9, wherein the ramps comprise a curved surface.

* * * * *